(No Model.)

A. F. BOARDMAN.
FISHING REEL.

No. 384,672. Patented June 19, 1888.

Witnesses:
Charles R. Searle
H. A. Johnstone

Inventor:
Alphonso F. Boardman
by his attorney
Thomas Drew Stetson

UNITED STATES PATENT OFFICE.

ALPHONSO F. BOARDMAN, OF BROOKLYN, NEW YORK, ASSIGNOR, BY MESNE ASSIGNMENTS, TO SARAH J. BOARDMAN, OF SAME PLACE.

FISHING-REEL.

SPECIFICATION forming part of Letters Patent No. 384,672, dated June 19, 1888.

Application filed January 6, 1888. Serial No. 259,969. (No model.)

*To all whom it may concern:*

Be it known that I, ALPHONSO F. BOARDMAN, of Brooklyn, in the county of Kings and State of New York, have invented a certain new and useful Improvement in Fishing-Reels, of which the following is a specification.

I provide the reel with a click which offers resistance and makes a loud noise when the reel is turned in one direction, and offers less resistance and makes little or no appreciable noise when the reel is turned in the opposite direction. It retards the movement and indicates to the ear how the work is proceeding when the fish is pulling out the line. I provide for throwing the device out of connection when desired. I provide a peculiarly-efficient brake to arrest the delivery of the line under certain conditions.

The accompanying drawings form a part of this specification and represent what I consider the best means of carrying out the invention.

Figure 1:
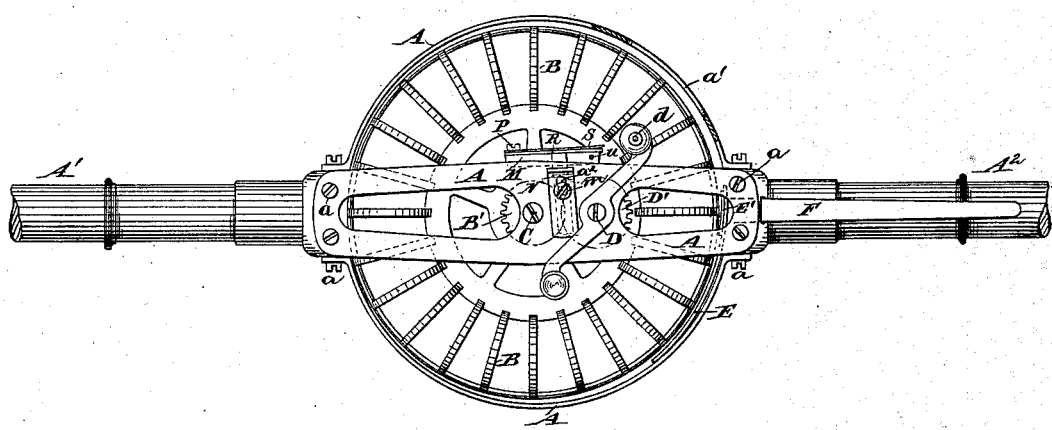
Figure 2:
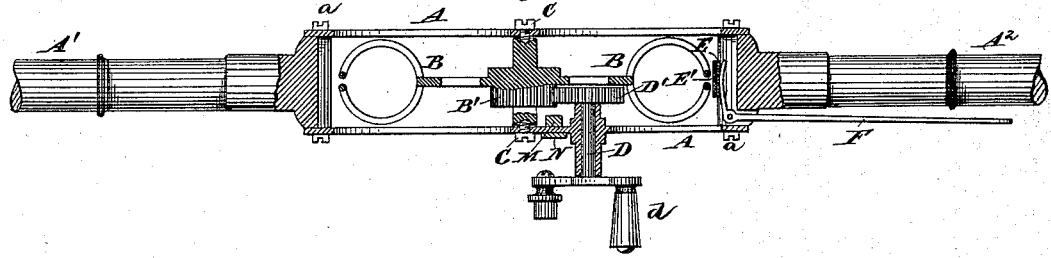
Figure 3:
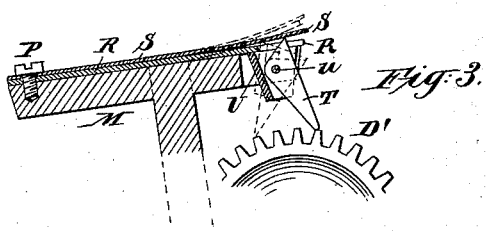
Figure 4:
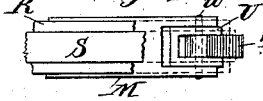

Figure 1 is a side elevation showing the novel parts, with so much of the ordinary parts as is necessary to show their relation thereto. Fig. 2 is a central longitudinal section, partly in plan. The remaining figures are on a larger scale. Fig. 3 is a vertical section, and Fig. 4 is a top view.

Similar letters of reference indicate corresponding parts in all the figures where they occur.

A' A² are portions of the fishing-rod mounted in line with each other, and supported firmly in sockets on a metallic frame, A, made of a number of parts firmly united by screws $a$. The reel B, having a form to give great capacity and lightness, is supported centrally in this frame, turning easily on bearings formed by the points of the screws C. The periphery is open-work and adapted to receive and store a liberal quantity of line and allow it to dry rapidly, and to receive and deliver the same through a slot, $a'$. A broad spur gear-wheel, B', fixed on the side of the reel B, is engaged by a spur gear-wheel, D', on a shaft, D, mounted independently in a bearing in the frame and turned by a crank, $d$. A sliding frame, M, is mounted adjustably on the inner face of the framing A. An exterior slide, N, mounted adjacent thereto on the outside of the frame, is connected with M by a bolt, $m$, extending through a slot in the framing A. The adjustable frame M carries a flat spring, R, surmounted by a spring, S, of less force, both being held to the frame M by a single screw, P. The end of the spring R is forked. The adjacent portion of the frame M is forked and loosely incloses a pivoted frame, U, within which is loosely inclosed and turning on the same pivot a pawl, T. The lower end of this pawl engages the teeth of the wheel D'. When the wheel D' is turned in the direction to unwind and deliver the line from the reel, the pawl T presses against the closed side of the case U, turning it on a pivot, $u$, and assuming the position shown in dotted lines, acting with its upper angle under the broad and stiff spring R, which resists forcibly and urges the lower end of the pawl T into strong contact with the several teeth of the wheel as they pass, thus making a loud noise and offering a corresponding resistance to the turning of the wheel and delivery of the line. When, on the contrary, the wheel D' is turned in the opposite direction to wind up the line, the framing U is allowed to resume its easy position and the strong spring R is of no effect. The body T of the pawl is deflected in the opposite direction, as shown in strong lines in Fig. 3. This position elevates the angle at the top of the pawl, which acts through the open space in the strong spring R and raises the gentler spring S. The force of this latter is alone exerted to press the pawl upon the teeth, and the sound and resistance as the line is reeled in are inappreciable.

In case it shall be desired to remove even this slight resistance during the reeling in of the line, or when for any reason, as in casting a light line to a great distance, it is desired to let the line run out freely, it is necessary simply to lift the frame M and its attached springs and pawl. This can be accomplished by applying the thumb to the exterior frame-piece, N, and moving it and its attachments upward so far as is allowed by the bolt $m$ in the slot $a^2$.

E is a curved spring riveted or otherwise fixed on the inner face of A, and carrying on its free end a shoe, E', arranged to bear on the periphery of the reel B whenever it is pressed inward with sufficient force by the short arm of the bell-crank lever F. The long arm of this lever is favorably located to be actuated by a finger of the left hand, while the hand can also firmly hold the rod.

The long arm of the lever F affords an advantage. If it is desired to apply a strong pressure, the operator bears upon said arm near its free end; but if only a slight pressure is desired he applies his thumb nearer the pivot.

In throwing a line to long distances it is necessary to let the reel run with the greatest possible freedom until the line strikes the water. It is then desirable to instantly arrest the reel to prevent its overrunning by momentum and unreeling more line than is necessary, with the liability to entanglements and other difficulties. The operator holds a finger or two fingers on the lever F during the running out of the line, and the moment he sees it strike the water presses the lever and applies the brake-shoe E', which arrests the turning of the reel and stops the delivery of the line almost instantly. Relaxing the force of the finger or fingers leaves the reel again free to be operated by the turning of the crank $d$ with the other hand, in the obvious manner. This lever F, and consequently the brake E', may be applied and liberated at any moment during a struggle with a fish.

Modifications may be made without departing from the principle or sacrificing the advantages of the invention. I can dispense with the second shaft and gear-wheel D D' and arrange the pawl T and its connections to act on the teeth of the gear-wheel B'.

Parts of the invention may be used without the whole.

I claim as my invention—

1. In a fishing-reel, the frame M, forked at one end, triangular pawl T, pivoted in said fork, and spring S, secured to said frame and normally bearing upon one arm of said pawl, in combination with the toothed wheel D', whose teeth engage the other arm of said pawl, and means for rotating said wheel, as and for the purpose set forth.

2. In a fishing-reel, the frame M, forked at one end, the open-front case U, pivoted in said fork, the triangular pawl T, pivoted in said case, the strong spring R, forked at its front end, whereby it normally bears upon said case in rear of said pivot, but straddles said pawl, the weak spring S, lying upon said strong spring and normally bearing upon one arm of said pawl forward of the pivot, and the screw P, for securing said springs in position, in combination with the toothed wheel D', whose teeth engage the other arm of said pawl, and means for rotating said wheel, as and for the purpose specified.

3. In a fishing-reel, the combination, with the frame A, having slot $a^2$, the reel B, having gear-wheel B', the gear-wheel D' engaging it, and means for rotating said gear D', of the frame M, exterior slide, N, pin $m$, connecting said frame and slide through said slot, and the spring-actuated pawl T, pivoted in said frame and normally engaging the teeth of said gear D', as and for the purpose specified.

4. In a fishing-reel, the combination, with the reel B and means for rotating it, the frame A, and nearly straight spring E, one end of which is secured to said frame and the free end of which carries a shoe, E', of the bell-crank lever F, pivoted at its angle to said frame, the long operating-arm of said lever extending along the fish-pole, and the short arm thereof being adapted to impart a radial motion to said shoe toward the center of said reel, as and for the purpose herein specified.

In testimony whereof I have hereunto set my hand, at New York city, N. Y., this 4th day of January, 1888, in the presence of two subscribing witnesses.

ALPHONSO F. BOARDMAN.

Witnesses:
CHARLES R. SEARLE,
M. F. BOYLE.